May 11, 1965 F. HURTH 3,182,557

APPARATUS FOR SHAVING GEARS

Filed Feb. 6, 1963 5 Sheets-Sheet 1

INVENTOR
FRITZ HURTH
BY Michael S. Striker
ATTORNEY

May 11, 1965 F. HURTH 3,182,557
APPARATUS FOR SHAVING GEARS
Filed Feb. 6, 1963 5 Sheets-Sheet 2
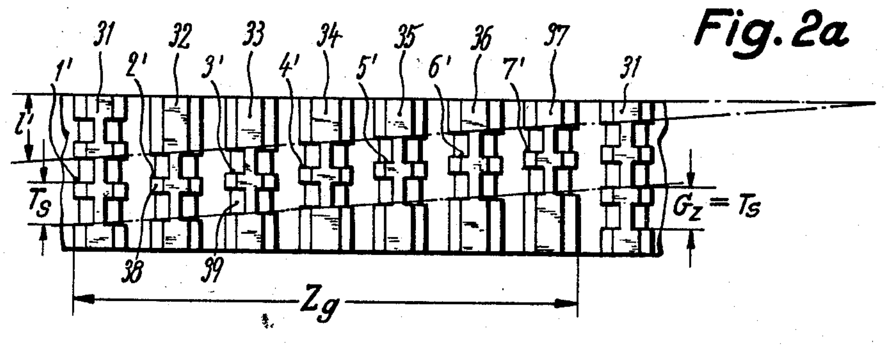
Fig. 2b
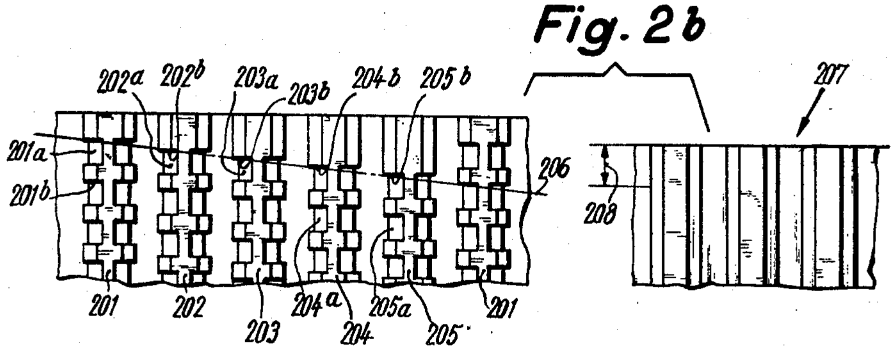
Fig. 2c
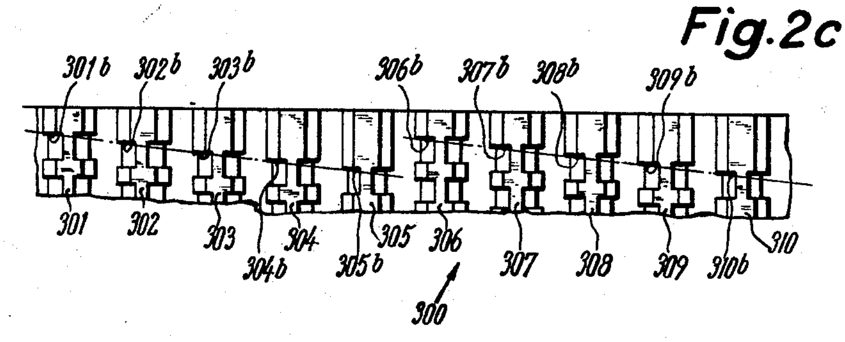
INVENTOR
FRITZ HURTH
BY Michael S. Striker
ATTORNEY Fig. 8 Fig. 6 (L, +1, l) Fig. 6a Fig. 11 Fig. 9 (R, -2, l) Fig. 9a INVENTOR
FRITZ HURTH
BY Michael S. Striker
ATTORNEY APPARATUS FOR SHAVING GEARS
Filed Feb. 6, 1963 5 Sheets-Sheet 4
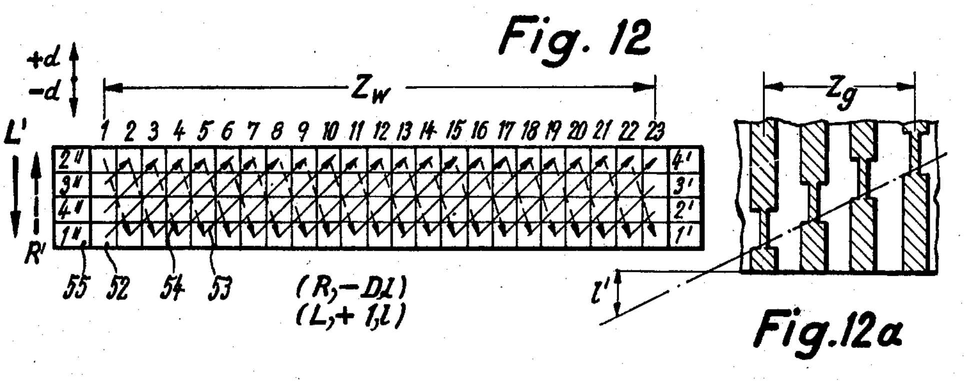
Fig. 12, Fig. 12a
Fig. 13
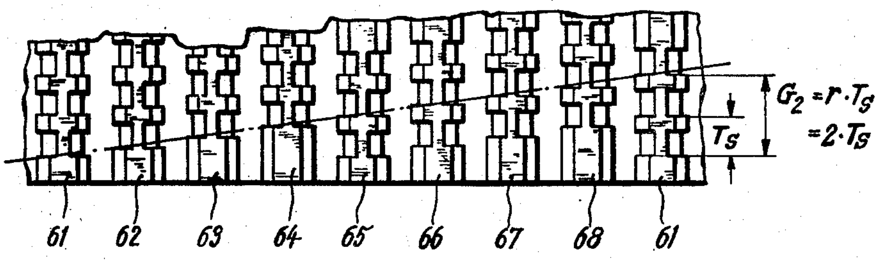
Fig. 14
$Z_w$
| 1" | 1 | 2 | 3 | 4 | 5 | 6 | 7 | |
|---|---|---|---|---|---|---|---|---|
| 2" | b | e | a | d | g | c | f | 5' |
| 3" | c | f | b | e | a | d | g | 4' |
| 4" | e | a | d | g | c | f | b | 3' |
| 5" | f | b | e | a | d | g | c | 2' |
| 1" | $a_1$ | d | g | c | f | b | e | 1' |
Fig. 14a
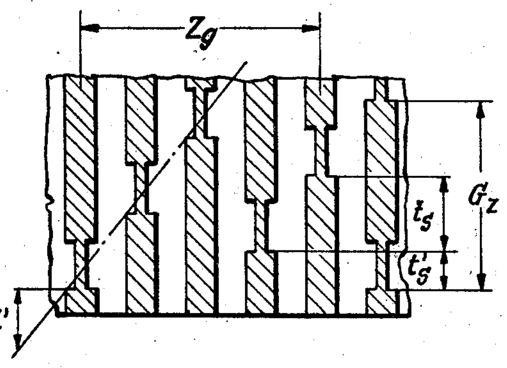
INVENTOR
FRITZ HURTH
BY Michael S. Striker
ATTORNEY

Fig. 15

| | | | | | | | | |
|---|---|---|---|---|---|---|---|---|
| 1 | 2 | 3 | 4 | 5 | 6 | 7 | 8 | teeth of the work gear |
| 1 | 2 | 3 | 4 | 5 | 6 | 1' | 2' | 1st revolution of the work gear |
| 3' | 4' | 5' | 6' | 1 | 2 | 3 | 4 | 2nd " " |
| 5 | 6 | 1' | 2' | 3' | 4' | 5' | 6' | 3rd " " |
| 1 | 2 | 3 | 4 | 5 | 6 | 1' | 2' | 4th " " |
| 3' | 4' | 5' | 6' | 1 | 2 | 3 | 4 | 5th " " |
| 5 | 6 | 1' | 2' | 3' | 4' | 5' | 6' | 6th " " |

Fig. 16

| | | | | | | | | |
|---|---|---|---|---|---|---|---|---|
| 1 | 2 | 3 | 4 | 5 | 6 | 7 | 8 | teeth of the work gear |
| 1 | 2 | 3 | 4 | 5 | 6 | 7 | 1' | 1st revolution of the work gear |
| 2' | 3' | 4' | 5' | 6' | 7' | 1 | 2 | 2nd " " |
| 3 | 4 | 5 | 6 | 7 | 1' | 2' | 3' | 3rd " " |
| 4' | 5' | 6' | 7' | 1 | 2 | 3 | 4 | 4th " " |
| 5 | 6 | 7 | 1' | 2' | 3' | 4' | 5' | 5th " " |
| 6' | 7' | 1 | 2 | 3 | 4 | 5 | 6 | 6th " " |
| 7 | 1' | 2' | 3' | 4' | 5' | 6' | 7' | 7th " " |
| 1 | 2 | 3 | 4 | 5 | 6 | 7 | 1' | 8th " " |

Fig. 17

| | | | | | | | | |
|---|---|---|---|---|---|---|---|---|
| 1 | 2 | 3 | 4 | 5 | 6 | 7 | 8 | teeth of the work gear |
| 1 | 2 | 3 | 4 | 0 | 1' | 2' | 3' | 1st revolution of the work gear |
| 4' | 1 | 2 | 3 | 4 | 0 | 1' | 2' | 2nd " " |
| 3' | 4' | 1 | 2 | 3 | 4 | 0 | 1' | 3rd " " |
| 2' | 3' | 4' | 1 | 2 | 3 | 4 | 0 | 4th " " |
| 1' | 2' | 3' | 4' | 1 | 2 | 3 | 4 | 5th " " |
| 0 | 1' | 2' | 3' | 4' | 1 | 2 | 3 | 6th " " |
| 4 | 0 | 1' | 2' | 3' | 4' | 1 | 2 | 7th " " |
| 3 | 4 | 0 | 1' | 2' | 3' | 4' | 1 | 8th " " |
| 2 | 3 | 4 | 0 | 1' | 2' | 3' | 4' | 9th " " |
| 1 | 2 | 3 | 4 | 0 | 1' | 2' | 3' | 10th " " |

INVENTOR
Fritz Hurth
BY Michael S. Striker
his ATTORNEY

United States Patent Office 3,182,557
Patented May 11, 1965

3,182,557

APPARATUS FOR SHAVING GEARS

Fritz Hurth, Grunwald, near Munich, Germany, assignor to Carl Hurth Maschinen- und Zahnradfabrik, Munich, Germany Filed Feb. 6, 1963, Ser. No. 256,750
Claims priority, application Germany, Feb. 8, 1962, H 44,815
12 Claims. (Cl. 90—1.6)

The present invention relates to an apparatus for finishing gears, and more particularly to shaving of work gears by means of a gear-like tool whose teeth are formed with radially extending cutting or shaving edges. Still more particularly, the invention relates to shaving of work gears at crossed axes with minimal or without any induced axial movement of the shaving tool relative to the work gear or vice versa.

In many conventional shaving machines, the cutting edges in the one or the other flank of consecutive teeth on a shaving tool are disposed in parallel planes. Such tools are considered satisfactory for shaving of work gears which are moved axially with respect to the shaving tool or vice versa, i.e., wherein one of the cooperating gears is induced to move axially with respect to the other thereof so as to cause axially directed reciprocatory movements of cutting edges with respect to the flanks of teeth on the work gear in addition to such axial movements which take place automatically owing to the crossed-axes mounting of the gears.

However, the shaving action of such tools is much less satisfactory if the axial movement of cooperating gears is negligible or if the shaving operation is carried out in accordance with the so-called dipping or plunge shaving process, which is characterized by total absence of any induced axial movement of the shaving tool and/or of the work gear. In such instances, the cutting edges will form chatter marks or ridges which extend from the roots toward the outer faces of teeth on the work gear and whose formation is due to the fact that without sufficient axial movement between the cutting edges and the tooth flanks of the work gear, each cutting edge removes one or more shavings from spaced portions of the flank, i.e., the zones from which the shavings are removed do not overlap and are often sufficiently apart to produce pronounced ridges which defeat the primary purpose of the shaving operation because, even though certain irregularities in the configuration and/or finish of the tooth flanks are eliminated, the shaving operation produces new irregularities consisting of aforementioned ridges which render the work gear unsatisfactory for a number of uses.

In attempting to prevent the formation of such ridges, proposals were made to arrange the cutting edges in the one or in both flanks of consecutive teeth on the shaving tool in the form of helices which are formed by a substantial number of cutting edges to insure that such groups of cutting edges will treat a selected zone of each flank without leaving any portions of the flank unfinished. However, and as disclosed in my copending U.S. application Serial No. 158,407, such proposals have met with rather limited success because, in the absence of a specific relationship between the number of teeth on a work gear and the number of teeth on the tool, the quality of the shaving action obtainable with such tools is a hit-and-miss proposition without always insuring a satisfactory result.

It is an important object of my invention to provide an apparatus for shaving spur gears and other types of work gears with gear-like tools whose cutting edges form one or more helices, wherein the number of teeth on the work gear is correlated to the number of teeth on the tool or to the number of teeth whose cutting edges form a helix in such a way that the shaving action is greatly superior to the shaving action of tools whereon the number of teeth or the number of helically arranged groups of cutting edges is in no way related to the number of teeth on the work gear.

Another object of the invention is to provide an apparatus of the just outlined characteristics which eliminates the need for lengthy experimentation by enabling an operator to select such tool or tools which are best suited for treatment of a given work gear.

A further object of my invention is to provide an apparatus of the above outlined characteristics which, in addition to enabling an operator to select a tool with a requisite number of teeth, also enables an operator to take into consideration other factors which can contribute to a superior shaving action.

An additional object of the invention is to provide an apparatus for shaving spur gears and similar work gears wherein the shaving action is always uniform in all zones of each tooth flank and according to which such shaving action may be completed within exceptionally short periods of time.

A concomitant object of the invention is to provide a tool for use in my apparatus.

My invention is based in part on the recognition, disclosed in the aforementioned U.S. patent application Serial No. 158,407, that the shaving action of a tool with helically arranged groups of cutting edges will improve if the number of teeth on the tool or the number of cutting edges which together form a group of helically arranged cutting edges is correlated to the number of teeth on a work gear in such a way that a tooth flank of the work gear comes into renewed contact with a given cutting edge only after this or an equivalent cutting edge has shaved each other tooth of the work gear. Furthermore, the tool may be provided with one or more additional teeth which are without cutting edges or whose cutting edges do not form helices with the cutting edges of the remaining teeth so that the cutting edges of such additional teeth remove shavings from zones which are being shaved by helically arranged cutting edges or from zones which, otherwise, would not be shaved at all.

The just described methods of correlating the number of teeth or the number of grouped cutting edges on the tool to the number of teeth on the work gear produce very good results and insure that all zones of each flank are shaved after the tool performs a series of revolutions, but the finish of shaved flanks is not always the same. Therefore, and as a further development of the invention disclosed in the aforementioned U.S. patent application Serial No. 158,407, I now provide an apparatus for shaving a spur gear or a similar work gear in such a way that each tooth flank of the work gear is preferably shaved in a direction from the one toward the other axial end thereof and that removal of shavings takes place from the finished toward the unfinished portion of the respective flank. According to a further feature of the invention, the thickness of shavings increases in a direction from the finished toward the unfinished portion of a tooth flank.

My apparatus, the work gear rotates in mesh with a rotary gear-like tool whose cutting edges are arranged in one or more helical groups and whose axis crosses the axis of the work gear, and the lead of the helices formed by the groups of cutting edges is correlated to the direction in which the projection of the tool axis (onto the plane of the work gear axis) is inclined relative to the work gear axis in such a way that the cutting edges consecutively remove shavings in a direction from the finished (shaved) toward the unfinished portion of the tooth flanks. The projection of the tool axis is angularly displaced in a clockwise direction and the lead of the helices is a right-hand lead.

The relationship between the number of teeth on the work gear and the number of cutting edges which together form a helically arranged group may be expressed by the equation $n \cdot Z_g = Z_w + D$ wherein $Z_w$ is the number of teeth on the work gear, wherein $Z_g$ is the number of teeth whose cutting edges together form a group of helically arranged cutting edges, wherein $n$ is a whole number, e.g., $n=1$, and wherein D is a whole number which is less than the number of cutting edges in a group and which is less than the number of teeth on the work gear. In accordance with an advantageous feature of my invention, the rest value D preferably equals one.

If the projection of the tool axes is angularly displaced in an anticlockwise direction and the lead of the helices is a left-hand lead, the relationship between the number of teeth on the workgear and the number of cutting edges which together form a helically arranged group may be expressed by the equation $$n \cdot Z_g = Z_w + D$$

If the projection of the tool axes is angularly displaced in a clockwise direction and the lead of the helices is a left-hand lead, the relationship between the number of teeth on the workgear and the number of cutting edges which together form a helically arranged group may be expressed by the equation $$n \cdot Z_g = Z_w - D$$

If the projection of the tool axes is angularly displaced in an anticlockwise direction and the lead of the helices is a right-hand lead, the relationship between the number of teeth on the workgear and the number of cutting edges which together form a helically arranged group may be expressed by the equation $$n \cdot Z_g = Z_w - D$$

The number of teeth on the toolgear may be expressed by the equation $Z_s = m \cdot Z_g$, wherein $Z_s$ is the number of teeth of the toolgear, $m$ is a whole number, e.g., $m=1$, and $Z_g$ is the number of teeth of a group.

By observing this rule it is insured that the direction of sliding along the flanks of the gearteeth in consequence of the crossed axes meshing equals the direction of the proceeding of the cutting edges on one flank of the workgear.

If desired, one of the cooperating gears may be induced to perform axial movements through distances which are at most equal to the lead of the helix formed by a group of cutting edges, i.e., which is at most equal to the distance between a pair of corresponding axially spaced cutting edges on a given tooth flank of the tool. The manner in which such axial movements may be brought about is disclosed, for example, in U.S. Patent No. 2,542,569.

The novel features which are considered as characteristic of the invention are set forth in particular in the appended claims. The apparatus itself, however, both as to its construction and its method of operation, together with additonal features and advantages thereof, will be best understood from the following detailed description of certain specific embodiments with reference to the accompanying drawings, in which:

FIG. 1 is a fragmentary elevational view of an apparatus which embodies one form of my invention, showing portions of two mating gears one of which constitutes the tool and the other of which constitutes the work gear;

FIG. 2 is a top plan view of the structure shown in

Figures 1, 2, 3, 3A, 4, 5:
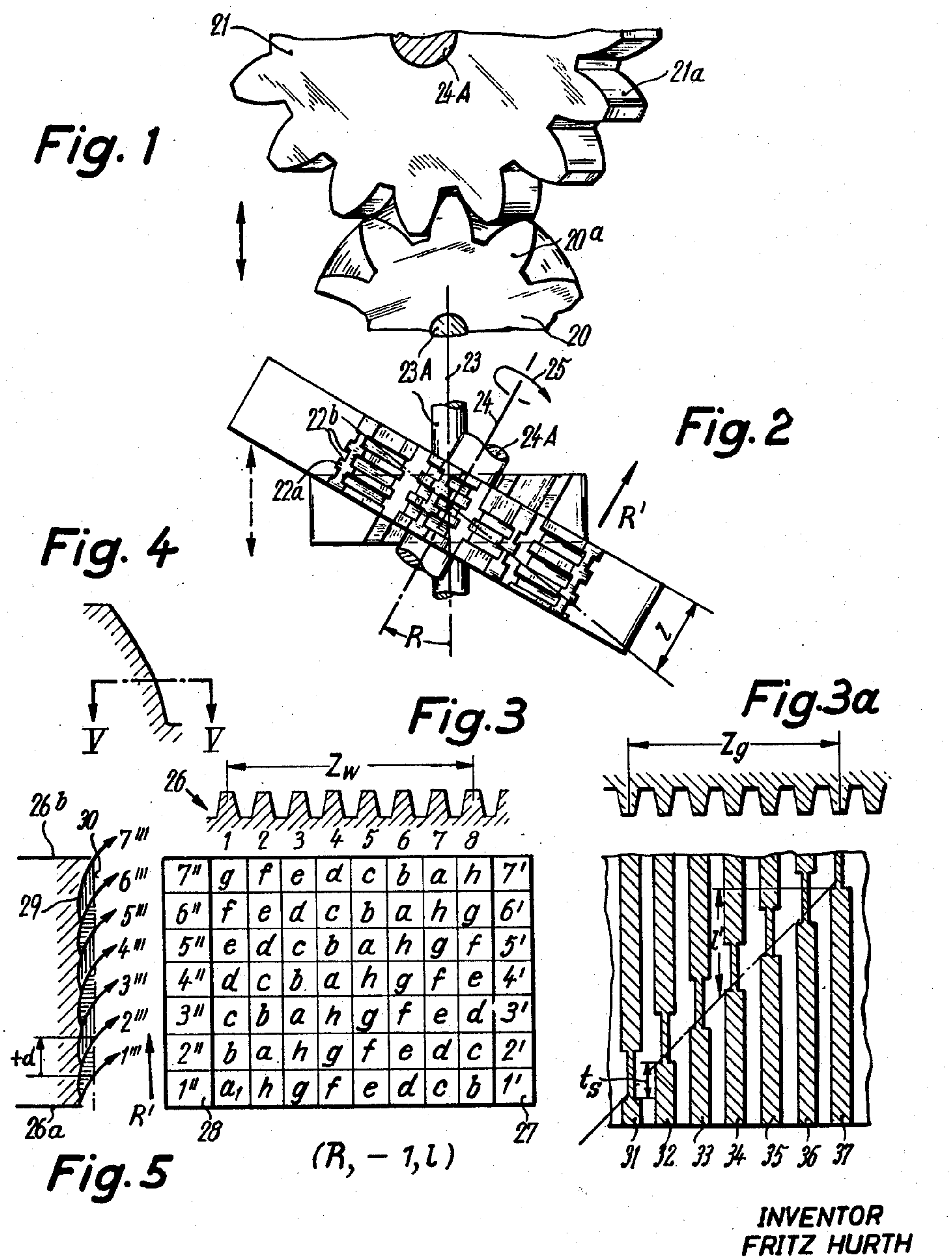
Figures 6, 6A, 7, 8:
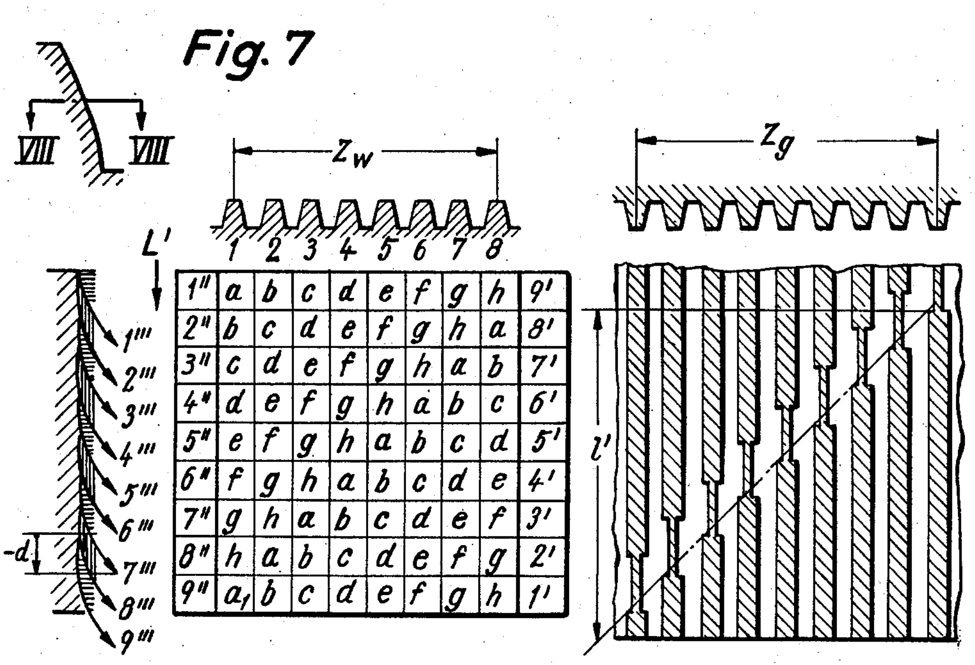
Figures 9, 9A, 10, 11:
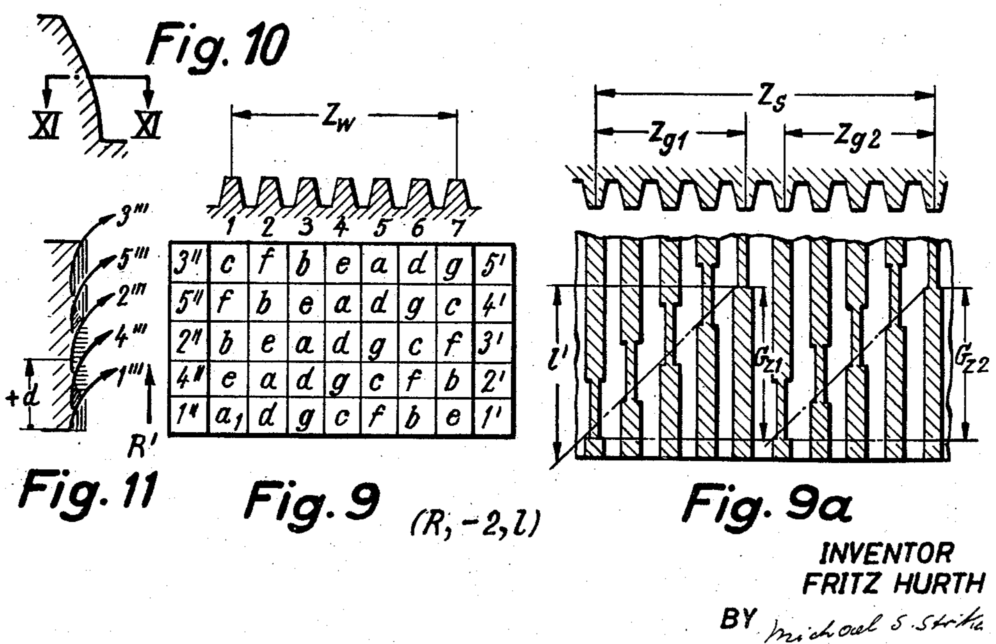

FIG. 1, showing the crossed-axes mounting of the gears and the cutting edges on the flanks of the tool;

FIG. 2*a* is a schematic developed view of the tool shown in FIG. 2;

FIG. 2*b* is an end elevational view of a work gear and a fragmentary end elevational view of a tool whose cutting edges form a single helix;

FIG. 2*c* is a fragmentary end elevational view of a different tool whose cutting edges form two helices arranged end-to-end;

FIG. 3 is a developed sectional view of a work gear with eight teeth, further showing a table to illustrate the sequence in which a group of helically arranged cutting edges shaves the flanks of consecutive gear teeth;

FIG. 3*a* is a schematic developed view of a tool which is utilized to shave the gear of FIG. 3;

FIG. 4 is an enlarged fragmentary section through a tooth which forms part of the work gear shown in FIG. 3;

FIG. 5 is a section as seen in the direction of arrows from the line V—V of FIG. 4, showing the manner in which shavings are being removed from one flank of the tooth;

FIG. 6 is a developed sectional view of another work gear with eight teeth, further showing a table to illustrate the sequence in which a group of nine helically arranged cutting edges removes shavings from the flanks of consecutive gear teeth;

FIG. 6*a* is a schematic developed view of a tool which is utilized to shave the gear of FIG. 6;

FIG. 7 is an enlarged fragmentary section through a tooth forming part of the gear shown in FIG. 6;

FIG. 8 is a section as seen in the direction of arrows from the line VIII—VIII of FIG. 7, showing the manner and the sequence in which shavings are being removed from one flank of the tooth;

FIG. 9 is a developed sectional view of a work gear with seven teeth, further showing a table to illustrate the sequence in which two end-to-end arranged helical groups of cutting edges remove shavings from the flanks of consecutive gear teeth;

FIG. 9*a* is a schematic developed view of a tool which is used to shave the gear of FIG. 9;

FIG. 10 is an enlarged fragmentary section through a tooth forming part of the gear shown in FIG. 9;

FIG. 11 is a section as seen in the direction of arrows from the line XI—XI of FIG. 10, further showing the manner and the sequence in which shavings are being removed from one flank of the tooth;

FIG. 12 illustrates a table representing the sequence in which the flanks of a work gear with twenty-three teeth are being shaved by a group of four helically arranged cutting edges;

FIG. 12*a* is a schematic developed view of the tool which is utilized to shave the just described gear;

FIG. 13 is a schematic developed view of a modified gear-shaped tool with several groups of helically distributed cutting edges which are arranged side-by-side;

FIG. 14 is a table showing the sequence in which the flanks of a work gear with seven teeth are shaved by a tool whose cutting edges form two end-to-end arranged helices and wherein the cutting edges of one helix are staggered axially with respect to the cutting edges of the other helix;

FIG. 14*a* is a schematic developed view of a tool which is used to shave the gear mentioned in connection with FIG. 14;

FIG. 15 is a table showing the sequence in which the flanks of a work gear with eight teeth are shaved by a cutting tool if the number of cutting edges in a group of helically arranged cutting edges is not selected in accordance with my invention;

FIG. 16 is a similar table illustrative of a shaving operation which is carried out upon a work gear with eight teeth in accordance with the method of my invention by using a gear-like tool with two end-to-end arranged groups of helically distributed cutting edges each of which comprises seven cutting edges; and FIG. 17 is a table illustrative of a shaving operation upon a work gear with eight teeth by means of a tool which comprises nine teeth including a tooth which is without cutting edges.

Referring now in greater detail to the drawings, and first to FIGS. 1 and 2, there is shown a work gear 20, hereinafter simply called gear, and a gear-like shaving tool 21, hereinafter called cutter, which latter is assumed to rotate about the axis 24 of its shaft or spindle 24A in a direction indicated by the arrow 25. The gear 20 is mounted on a shaft or spindle 23A whose axis is indicated by the line 23. The flanks on the gear teeth 21*a* of the cutter 21 are formed with alternating grooves 22 and ribs or lands 22*a* to define a series of parallel cutting edges 22*b* each extending radially in a plane which is perpendicular to the axis 24. The apparatus of FIGS. 1 and 2 is utilized for so-called crossed-axes shaving, i.e., the axis 24 of the cutter 21 crosses in space the axis 23 of the gear 20, and it is assumed that the shaving operation is carried out with minimal or without any induced axial reciprocation of the gear 20 with respect to the cutter 21 or vice versa. In other words, any axial movements of the cutting edges 22*b* are due solely to crossed-axes mounting of the cutter 21.

In the embodiment of FIGS. 1 and 2, the positioning of the axes 23, 24 is such that the projection of the axis 24 onto the plane of the drawing (which passes through the axis 23) makes with the axis 23 an acute angle and that the axis 24 is displaced angularly in a clockwise direction as indicated by the arrow R in FIG. 2. Such positioning of the cutter causes the cutting edges 22*b* not only to cut into but also to slide along the flanks of the gear teeth 20*a* (arrow R') when the cutter rotates. In other words, in crossed-axes shaving, there will be some axial movement of cutting edges with respect to the meshing teeth 20*a* of the gear even if the cutter is held against induced axial movement with respect to the gear or vice versa.

The cutting edges on consecutive teeth 21*a* of the cutter 21 form a series of helices each having a lead $l$, this lead being a left-hand lead as viewed in FIG. 2 which illustrates that half of the cutter which is diametrically opposite the teeth meshing with the gear teeth 20*a*. Referring to FIG. 2*a*, there is shown (in developed view) that half of the cutter 21 whose teeth are momentarily in mesh with the teeth of the gear 20. One can discern the flanks of seven teeth 31–37 which mate with the gear teeth 21*a*.

In FIG. 2*a*, the lead $l'$ of a series of helically arranged cutting edges (which are spaced from the cutting edges 1'–7' through distances equal to the width of a rib or land 39) seems to be a right-hand lead because in FIG. 2 one looks at a non-transparent cutter 20 whereas FIG. 2*a* shows the concealed portion of this cutter as viewed in FIG. 2.

The reference character $T_s$ indicates the distance between a pair of corresponding cutting edges on a selected tooth flank of the cutter 20, that is, the combined width of a land 39 and a groove 38, as viewed in the axial direction of the cutter. The character $G_z$ is used to denote the number of cutting edges on a series of consecutive cutter teeth which together form a helix with the lead $l'$. This number $G_z$ of cutting edges will be referred to as a group of cutting edges.

It is now assumed, merely for the sake of simplicity, that the cutter 21 of FIGS. 1, 2 and 2*a* comprises seven teeth, 31–37 ($G_z=7$), and it is also assumed that the lead $l'$ shown in FIG. 2*a* extends over all of such teeth. In other words, the axial distance between the cutting edge 1' on the first tooth 31 and the cutting edge 101' on the same tooth 31 is $T_s$. The cutting edges 1'–7' on the respective teeth 31–37 together form a helix whose lead is $l'$. The character $t_s$ indicates the axial distance between a cutting edge (101') on a given tooth flank (31) and the nearest cutting edge (102') of the group $G_z$ on the next tooth flank (32). Thus, $G_z \cdot t_s = T_s$. If the cutter comprises $n$ groups $G_z$ of cutting edges all of which shave the same section of a tooth flank, the total number of teeth on the cutter is $n \cdot G_z$.

Since the machines for crossed-axes shaving are well known, the illustration of FIGS. 1, 2 and 2*a* is sufficient to explain the invention to a man having ordinary skill in the art of finishing gear teeth. As mentioned hereinabove, an important feature of the invention resides in a specific relationship between the number of teeth on the cutter, the number of teeth on the gear, the direction (right-hand or left-hand) of inclination of the cutter axis 24 with respect to the gear axis 23, and the direction (right-hand or left-hand) of the lead of the helix which is formed by a group $G_z$ of cutting edges on the cutter. This specific relationship will now be explained in greater detail with reference to a series of specific examples one of which is shown in FIGS. 3, 3*a*, 4 and 5.

Prior to proceeding with the description of the first example, I will explain the exact meaning of the expression "group" or "groups" ($G_z$) of cutting edges by referring to FIGS. 2*b* and 2*c*.

FIG. 2*b* is a developed view of a cutter 200 which comprises five teeth 201–205. One flank of each of these teeth is respectively provided with a groove 201*a*–205*a* respectively defining cutting edges 201*b*–205*b*. The cutting edges 201*b*–205*b* together form a helix whose lead is indicated by a line 206. If the cutter 200 is not induced to perform any axial movements with respect to the workpiece, the cutting edges 201*b*–205*b* will treat portions of a selected zone on each tooth flank of a workpiece 207, and the axial length 208 of such zones equals the axial distance between the cutting edges 201*b* and 205*b*. Thus, the cutter 200 comprises a single group $G_z$ of cutting edges.

FIG. 2*c* shows a cutter 300 which comprises ten teeth 301–310. The teeth 301–305 have helically arranged cutting edges 301*b*–305*b* which form a first group $G_{z_1}$ and the teeth 306–310 have helically arranged cutting edges 306*b*–310*b* which form a second $G_{z_2}$. These two groups are aligned (arranged end-to-end) so that each thereof will shave portions of the same zone of a flank on each tooth of a workpiece. Thus, when referring to a cutter which comprises several groups of cutting edges, I wish to state that such groups are arranged end-to-end so that they treat the same zone of a given flank on each tooth of a workpiece. Of course, and as shown in FIG. 2, the cutter normally comprises teeth each of which is formed with a large number of cutting edges so that several groups of cutting edges are arranged side-by-side to shave different zones or sections of tooth flanks on a workpiece. However, since the shaving action of such side-by-side arranged groups is analogous, the following part of this description will refer mainly to groups $G_z$ which are arranged end-to-end and each of which treats the same section of a selected tooth flank on each tooth of the workpiece, unless I will expressly state that the groups $G_z$ are side-by-side rather than end-to-end.

FIG. 3 shows in developed view a gear 26 which comprises eight teeth ($Z_w=8$). The table which is shown below the gear 26 comprises a series of vertical columns including a left-hand column 28, a right-hand column 27, and eight median columns each of which is located below a tooth of this gear; these teeth are numbered consecutively by numerals 1–8 in the uppermost horizontal row of the table.

FIG. 3*a* shows schematically, and in a view which corresponds to that of FIG. 2*a*, a cutter which comprises seven teeth 31–37, and the cutting edges of consecutive helically arranged teeth which form a group of $G_z$ are identified by numerals 1'–7'. These numerals are shown again in the right-hand column 27 of the table in FIG. 3. The lead $l'$ of the helix formed by the axially staggered cutting edges 1′–7′ is a left-hand lead, i.e., the same as shown in FIGS. 2 and 2*a*. It will be noted that $Z_w=Z_g+1$ or $Z_g=Z_w-1$ or $n\cdot Z_g=Z_w-1$ or $m\cdot Z_g=Z_s$, wherein $Z_w$ is the total number of teeth on the gear 26, wherein $Z_s$ is the total number of teeth on the cutter, wherein $n=m=1$, and wherein $Z_g$ is the number of teeth on the cutter corresponding to a group ($G_z$) of cutting edges. In the present instance, $G_z=Z_g=Z_s$. Each of the above equations can be solved to show that the number of teeth on the cutter is seven if the gear 26 has eight teeth, i.e., that the number $Z_g$ is the same as $Z_w$ minus one.

The table of FIG. 3 further illustrates the sequence in which each tooth flank of the gear 26 is treated by the cutting edges 1′–7′. Thus, cutting edge 1′ of the tooth 31 is the first to engage a flank of the tooth 1 which forms part of the gear 26 to remove a shaving or chip $a_1$. The cutting edge 2′ thereupon removes a shaving *a* from one flank of the tooth 2 on the gear 26, the cutting edge 3′ then removes a shaving *a* from one flank on the tooth 3 of the gear 26, and so forth. In other words, during the first revolution of the cutter, each of the cutting edges 1′–7′ respectively removes a shaving *a* from the teeth 1–7 of the gear 26. In the second pass, to wit: during the next revolution of the cutter, the cutting edge 1′ removes a shaving *b* from the tooth 8 of the gear, the cutting edge 2′ removes a shaving *b* from the tooth 1 of the gear next to the zone from which the shaving $a_1$ was removed, the cutting edge 3′ removes a shaving *b* from the tooth 2 at a point next to the zone from which the shaving *a* was removed, and so forth. The shavings consecutively removed from the teeth 1–8 on the gear 26 during the first seven revolutions of the cutter are indicated by reference characters *a–g*, and the characters *h* indicate shavings removed from the same zones as the respective shavings *a* at the time the cutter performs the eighth revolution.

The table of FIG. 3 reveals the following:

(1) A selected zone of a given flank on a tooth (say the tooth 1) of the gear 26 comes into renewed engagement with a given cutting edge (say the cutting edge 1′) after such selected zone has been treated by all other cutting edges of the respective group $G_z$. In the present instance, the width of such selected zone of a given flank on the tooth 1 of the gear 26 equal $T_s$, i.e., the axial distance between a pair of corresponding cutting edges on a given tooth flank of the cutter. Of course, the same applies if the cutting edges of the cutter are arranged in two or more groups $G_z$. For example, if the cutting edges are arranged in two groups which are disposed end-to-end and each of which comprises seven cutting edges, the shavings *a* will be removed by the cutting edges of the first group during the first half revolution of the cutter, the shavings *b* will be removed by the cutting edges of the second group during the second half revolution of the cutter, the shavings *c* will be removed by the first group of cutting edges during the third half revolution, the shavings *d* will be removed by the second group of the cutting edges during the fourth half revolution, etc. If the cutting edges of the cutter are arranged in three groups which are disposed end-to-end, the situation is again substantially the same because the first, second and third groups of cutting edges will respectively remove shavings *a*, *b* and *c* during the 1st, 2nd and 3rd part of the first revolution; the first, second and third groups of the cutting edges will then remove shavings *d*, *e* and *f* during the 1st, 2nd and 3rd part of the second revolution of the cutter; etc. In all such cases, a selected zone of a flank on a given tooth of the gear 26 will come into renewed contact with a given cutting edge after such selected zone was treated by all other cutting edges of the respective group or groups.

(2) The axial distance $t_s$ between a pair of adjacent cutting edges (say the cutting edges 1′, 2′) on two adjacent teeth (31, 32) is so small that, when a selected zone of a tooth flank on the gear 26 comes into renewed contact with the cutting edge 1′, it has been completely shaved by the other cutting edges so that shavings *a–g* were removed without the formation of ridges therebetween. This is shown in the column beneath the gear tooth 1 which, when read from the botttom up, shows that shavings $a_1$, *b*, *c*, *d*, *e*, *f*, *g* are removed from the flank of the tooth 1 in the just described sequence and that the next shaving *h* is removed from the same spot as the shaving $a_1$, i.e., from a partly finished portion of the flank. The sequence in which the shavings $a_1$–*g* are removed from the flank of the tooth 1 on the gear 26 is indicated in the column 28 by numerals 1″–7″. The direction in which the shavings *a–g* are removed coincides with the direction R′ in which the cutting edges move with respect to the teeth of the gear 26 as a result of crossed-axes mounting. The distance (*d*) between the consecutive points of engagement of two cutting edges with a selected zone of a given flank on the gear 26 is the same as the distance $t_s$, i.e., $d=t_s$.

Referring now to FIGS. 4 and 5, there is shown one flank of the tooth 1 on the gear 26, and it will be seen that the consecutive shavings 1‴–7‴ are removed in this sequence without the formation of ridges and in a direction from the interior (shaved or finished surface) toward the exterior (unshaved or unfinished surface) of the flank but in such a way that the first shaving 1‴ is removed from a flank portion close to the one end face **26*a* of the cutter and that the last shaving 7‴ is removed from a flank portion close to the other end face 26*b* of the gear. The shavings 1‴–7‴** of FIG. 5 correspond to the shavings $a_1$–*g* in the column nearest to the column 28 of the table shown in FIG. 3. FIG. 5 further shows that, owing to relative movement of the cutting edges and the tooth flanks on the gear 26 (arrow R′), the thickness of each shaving 1‴–7‴ increases in a direction from the shaved or finished portion toward the unshaved or unfinished portion of a flank on the tooth 1. Such removal of shavings is due to the fact that the direction of movement of the cutting edges in the axial or longitudinal direction of the tooth 1 is the same as the direction of the lead *l′*. In other words, the relative movement resulting from crossed-axes mounting of the gear and cutter should be in the same direction as the lead of the helix formed by a group of cutting edges. This means that the direction from the flank portion which was treated by removal of the shaving $a_1$ (edge 1′) toward that portion of the same flank from which the cutting edge 2′ has removed the shaving *b* is the same as the direction of movement of cutting edges longitudinally (axially) of the respective tooth. This can be expressed by abbreviations R, R′, *l′*, wherein R is the clockwise angular displacement of the cutter axis with respect to the gear axis, wherein R′ is direction of axial movement of cutting edges relative to the flanks of the gear teeth, and wherein *l′* is the lead of the helix formed by the group of cutting edges.

FIGS. 6, 6*a*, 7 and 8 illustrate a second example according to which a gear 26 again comprises eight teeth but wherein a group $G_z$ comprises nine cutting edges 1′–9′ so that, and assuming that the cutter is formed with a single group $G_z$ of cutting edges, it comprises nine teeth. For the sake of simplicity, FIG. 6*a* shows a cutter wherein the number of cutting edges 1′–9′ in a group $G_z$ equals the total number ($Z_g=Z_s$) of teeth on the cutter. Thus, $n\cdot Z_g=Z_r=Z_w+1$ or $\underline{m}\cdot Z_g=Z_s$, wherein $Z_r$ is the arithmetic number of teeth meaning the number of teeth on the cutter ±D, D being the difference between the number of teeth on the gear and the cutter, wherein $\underline{n}=\underline{m}=1$, wherein $Z_w=8$, wherein $Z_g=9$, and wherein $Z_s$ equals $Z_g$ and indicates the total number of teeth on the cutter which, in this example, equals the number $Z_g$ of teeth whose cutting edges together form a helix and wherein such cutting edges form a group $G_z$. Also, $D=+1$, wherein D is the aforementioned difference between the number of teeth on the cutter and the gear. This difference is positive if $Z_s$ is the minuend but is negative if $Z_s$ is the subtrahend. Since the sequence in which the cutting edges 1'–9' engage the flank of the tooth 1 is different from that shown in FIG. 5 (it is to be noted in the column beneath the gear tooth 1 of FIG. 6 that the cutting edges 1'–9' engage this flank first at a point close to the upper end face of the gear, as viewed in FIG. 8, and ultimately at a point close to the lower end face of the gear), the axis of the gear must be inclined in an anticlockwise direction (L) to insure that the movement of cutting edges in the longitudinal (axial) direction of a selected tooth (arrow L') owing to crossed-axes mounting of the gear is the same as the direction in which the removal of consecutive shavings takes place. Thus, $-d=t_s$, and the lead $l'$ of the helix formed by the cutting edges 1'–9' is a left-hand lead.

FIG. 8 shows that the thickness of shavings 1'''–9''' increases in a direction from the shaved portion toward the unfinished portion of the respective tooth flank on the gear. This is again due to the fact that relative movement (arrow L') of the cutting edges longitudinally (axially) of the gear tooth takes place in the same direction as the removal of consecutive shavings 1'''–9'''. In other words, and as mentioned hereinabove, if the difference alters from −D to +D, the axis of the cutter must be inclined in an anticlockwise direction (L).

FIGS. 9 to 11 show another example according to which a gear having seven teeth (see the uppermost row of the table in FIG. 9) is shaved by a cutter which comprises ten teeth and wherein such cutter teeth form two series $Z_{g1}$ and $Z_{g2}$ respectively having groups $G_{z1}$ and $G_{z2}$ of cutting edges. Consequently, $$n \cdot Z_g = Z_w - 2 \text{ or } m \cdot Z_g = Z_s$$

wherein $\underline{n}=1$, $\underline{m}=2$, $Z_g=Z_{g1}=Z_{g2}$, $Z_w=7$, and $Z_s=10$.

As shown in the table of FIG. 9, the cutting edges 41–45 of the group $G_{z1}$ will remove shavings $\underline{a}$, $\underline{c}$, $\underline{e}$, $\underline{g}$, and the cutting edges 46–50 of the group $G_{z2}$ will remove shavings $\underline{b}$, $\underline{d}$, $\underline{f}$ during the first revolution of the cutter. During the second revolution of the cutter, the cutting edges 41–45 will remove shavings from the flank portions from which the shavings $\underline{b}$, $\underline{d}$, $\underline{f}$ were removed and the cutting edges 46–50 will remove shavings from the spots that have given off the shavings $\underline{a}$, $\underline{c}$, $\underline{e}$ and $\underline{g}$. This is due to the fact that the cutting edges 41, 46–42, 47–43, 48–44, 49–45, 50 are respectively coplanar as shown in FIG. 9a. In this example, $D>1$ which means that the spacing between adjacent flank portions of a given gear tooth which are consecutively engaged by cutting edges is greater than in the previous examples, see FIG. 11. The direction of longitudinal movement of cutting edges (arrow R') along the flanks of gear teeth is the same as the direction from the first toward the next flank portions which are being shaved by the teeth 41–50. This combination can be expressed by the abbreviations $R$, $D=-2$, $l'$, $R'$.

In actual practice of my invention, it is possible to find a series of solutions each of which will produce a satisfactory result but one of which will result in optimal shaving action. The manner in which the optimal solution can be selected from a series of possible solutions will now be explained in connection with FIGS. 12 and 12*a*. The views of FIGS. 12 and 12*a* are similar to those of FIGS. 3 and 3*a* but are greatly simplified for the sake of clarity. The gear comprises twenty-three teeth (i.e., $Z_w=23$) which are indicated schematically by numerals 1–23 in the upper horizontal row at the head of the table in FIG. 12. The cutter of FIG. 12*a* comprises groups $G_z$ of four cutting edges ($G_z=Z_g$), and these cutting edges are identified by numerals 1'–4' in the right-hand column 51 of the table shown in FIG. 12. The lead $l'$ of the helix formed by the cutting edges 1'–4' is a left-hand lead.

The start of the shaving action is indicated at $\underline{x}$ in the field 52 below the tooth 1 of the gear and the shaving action progresses in directions indicated by arrows 53, 54.

The relationship between the cutter and the gear can be expressed as follows:

Given $Z_w=23$

Selected $D=-3$

Thus $Z_r=23-3=20$

Selected $Z_g=4$

Thus $\underline{n}=Z_r/Z_g=5$

Selected $\underline{m}=\underline{n}$

Thus $Z_s=5 \times 4=20$

Owing to the above selection of the number of groups $G_z$ and of the total number of teeth on the cutter, removal of shavings or chips from the flank of the tooth 1 progresses in a sequence 1''–4'' as indicated in the left-hand column 55 of FIG. 12. If the cutting edges are listed in the sequence in which they shave the flank of the gear tooth 1, the sequence is as follows: 1'–4'–3'–2'–1'. Consequently, the distance between the consecutively removed shavings may be defined as $\underline{d}=+3$. The numerical value of the character $\underline{d}$ indicates the actual distance between two shavings which are removed consecutively from a given tooth flank, whereas the "plus" sign indicates the direction in which the shaving action progresses. Thus, one must count as follows:

$$\underline{1}', 2', 3', \underline{4}', 1', 2', \underline{3}', 4', 1', \underline{2}', 3', 4', \underline{1}'$$

Since the direction of consecutive shaving "steps" is the same as the direction of the lead of the helices formed by the groups $G_z$ the conditions prevailing during the shaving action may be defined by the abbreviation: R, −D, $l'$, R'.

In the example of FIGS. 12 and 12*a*, a hole multiple of the number $Z_g$ does not approximate closely the number of gear teeth because $5Z_g=20$ whereas $Z_w=23$. Therefore, better results will be obtained if $G_z$ remains unchanged but if $\underline{n}=6$ because $Z_r=6.4=24$ and $$D=Z_r-Z_w=24-23=1$$

Also, $\underline{n} \cdot Z_g=Z_w+1=24$. If the cutter comprises twenty-four teeth, then the removal of chips from a given tooth flank of the gear takes place in the following sequence and $$\begin{matrix} & 1' & & 4' & & 3' & & 2' & & 1' & \\ \underline{d}= & & -1 & & -1 & & -1 & & -1 & & =t_s \end{matrix}$$

Since the sequence in which the shavings are removed is counter to the lead of the helices formed by the groups $G_z$, the inclination of the cutter axis must be in an anticlockwise direction, i.e., L, +1, $\underline{l}'$, L'. The just described selection of a cutter with twenty-four teeth is preferred because the number of cutter teeth or a whole multiple of such number or a rest-free fraction of such number approximates more closely the number of teeth on the gear. In fact, the preferred solution can be obtained right from the table of FIG. 12 because, by reading the column 55 from top to bottom, $\underline{d}=-1$.

FIG. 13 shows in developed view a cutter of the type mentioned in connection with FIG. 2*c*. Two groups $G_Z$ of cutting edges are arranged side-by-side to cover a distance $2 \cdot T_s$. The cutter comprises eight teeth 61–68.

In the heretofore described examples, the axial distance $\pm\underline{d}$ between two cutting edges which consecutively engage a given tooth flank of the gear was equal to D. However, and as shown in FIGS. 14 and 14*a*, it is possible to deviate from this principle without departing from the spirit of my invention. The cutting edges in the group $G_Z$ do not form a single helix but rather two helices including a first helix with a lead $\underline{r}'$ formed by the cutting edges on the teeth 61, 62, 63 and a second helix with the same lead but formed by the cutting edges of the teeth 64, 65. The cutting edges of the teeth 64, 65 are staggered axially with respect to the cutting edges of the teeth 61–63 so that the axial distance $t_{s'}$ between the cutting edges 61', 64' is one-half the axial distance between the cutting edges 61', 62' or 62', 63' or 63', 64'. The following equations are valid for the arrangement of FIGS. 14 and 14*a*:

$$\underline{n}\cdot Z_g=Z_w-D \text{ and } \underline{m}\cdot Z_g=Z_s$$

The total number ($Z_w$) of teeth on the gear is seven and, if $\underline{n}=\underline{m}=1$, then $D=2$ and $Z_g=5$. In this example, $\underline{d}=\frac{1}{2}D$.

It is further to be noted that one can calculate the distance between consecutive cutting edges of a group $G_z$ which forms a helix. Thus, and assuming that $Z_w=23$ and $T_s=2.1$, and if one selects $D=+1$, $\underline{n}=2$ and $\underline{m}=7$, one can calculate as follows:

$$Z_r=Z_w+1=24$$

$$Z_g=24/2=12$$

$$Z_s=7\times 12=84$$

$$t_s=T_s/Z_g=2.1/12=0.18$$

If the cutter axis is angularly displaced in a clockwise direction (R), the lead of the helix formed by each group of cutting edges on the cutter teeth must be a left-hand lead.

It goes without saying that, if the teeth of a cutter are provided with cutting edges which form two or more groups $G_z$ arranged end-to-end as shown in FIG. 2*c*, each such group may include a different number of cutting edges and the cutting edges of one group may be staggered with respect to the cutting edges of the other group or groups to bring about a superior shaving action because the zones of a tooth flank from which the shavings are removed overlap each other. Such modification will be readily understood by referring to FIG. 14*a*. In other words, the cutting edges of one group will remove shavings from spots located between the spots which are treated by the cutting edges of the other group or groups. In fact, the cutter of FIG. 2*c* is very similar to the cutter of FIG. 14*a* excepting that the number of cutting edges 64', 65' is different from the number of cutting edges 61'–63' and that the cutting edges 64', 65' are axially staggered with respect to each of the cutting edges 61'–63'.

The number of revolutions which the cutter and the gear must perform to complete the shaving action and to obtain a very satisfactory finish of tooth flanks on the gear is less than is necessary to complete the shaving action in accordance with heretofore utilized methods of which I have knowledge at this time. The number of revolutions must be sufficient to make sure that each tooth flank has been engaged at least once by each cutting edge of the tool and that the number of shavings removed from a section of a given tooth flank is the same as that removed from any other section of the same flank or another flank.

In order that my invention may be even more readily understood, I will now describe a shaving operation with reference to the table of FIG. 15 wherein the uppermost horizontal row contains an enumeration of consecutive teeth 1–8 on a gear and wherein the vertical columns beneath this uppermost row contain enumerations of cutting edges on the teeth of the cutter which come consecutively into shaving engagement with the tooth flanks of the gear. The cutter comprises two groups 1–6 and 1'–6' of cutting edges which are arranged end-to-end, i.e., the cutter comprises twelve teeth. It will be noted the tooth No. 2 of the gear is shaved only by the cutting edges 1, 3', 5; that the tooth No. 2 of the gear is shaved only by the cutting edges 2, 4', 6, etc. This is due to the fact that the number of teeth on the cutting tool and on the work gear which correspond to a group (1–6 or 1'–6') of helically arranged cutting edges have a common whole divisor (2) which is other than one. Thus, if the relationship between the number of teeth on the work gear and the number of teeth on the cutting tool is selected in a manner as represented by the table of FIG. 15, the shaving action will be inferior to the shaving action which is carried out in accordance with the method of my present invention.

Of course, since the groups 1–6 and 1'–6' are arranged end-to-end and since the cutting edges of one of these groups are assumed to be coplanar with the respective cutting edges of the other group (i.e., the cutting edges 1 and 1' are located in a common plane which is perpendicular to the axis of the cutter), it can be said that the work gear in the example of FIG. 15 is not shaved by the cutting edges 2, 4, 6 or 2', 4', 6' because the shaving action of cutting edges, 2, 4, 6 is respectively equivalent to the shaving action of cutting edges 2', 4', 6'. In other words, the cutting edge 2 will shave that same section of a flank on the tooth No. 2 of the work gear which would have been shaved were this flank engaged by the cutting edge 2'.

The table of FIG. 16 is illustrative of a shaving operation which is carried out in accordance with one feature of my method because the number of teeth on a work gear (having eight teeth which are enumerated in the first horizontal row of the table) and the number of cutting edges on the cutter which form a group of helically arranged cutting edges have only one common divisor, namely, each is divisible by the number one. The cutter is assumed to have fourteen teeth and the cutting edges on these teeth form two groups 1–7 and 1'–7' so that the numbers 8 and 7 have only one common divisor. Therefore, a flank on the tooth No. 1 of the work gear will be treated consecutively by the cutting edges 1, 2', 3, 4', 5, 6', 7 which is the same as if this flank were shaved by the cutting edges 1, 2, 3, 4, 5, 6, 7 because the cutting edges 1–7 and 1'–7' are respectively equivalent, i.e., the cutting edges 1 and 1' are located in a common plane which is perpendicular to the axis of the cutter.

During the eighth revolution of the work gear, a flank on the tooth No. 1 is again engaged by the cutting edge 1 which treats that same section of this flank which was shaved during the first revolution of the work gear. The same shaving action takes place during the 15th, 22nd, 29th, 36th etc. revolution of the work gear.

It should be kept in mind that the arrangement described in connection with the table of FIG. 16 is assumed to fulfill all of the conditions which must be fulfilled to carry out the method of my invention. Thus, it is further necessary that the lead of the helices formed by the groups of cutting edges be correlated to the direction of inclination of the cutter axis so that the shavings will be removed in a direction from the one toward the other end face of the work gear in the same direction in which the cutting edges of the tool move relative to the flanks of the work gear as a result of the crossed-axes mounting of the gears and as a result of eventual induced axial movement of the tool.

Of course, the situation becomes more complicated if the cutter comprises one or more additional teeth which are without cutting edges or whereon the cutting edges are arranged in a different way so that they do not form helices with the cutting edges 1–7 or 1'–7'. One such situation will be explained in connection with the table which is shown in FIG. 17.

In this example, the work gear comprises eight teeth and the cutter comprises nine teeth including a first group of teeth with helically arranged cutting edges 1–4, a fifth tooth (0) without cutting edges, and a second group of teeth with helically arranged cutting edges 1'–4'. It will be noted that such arrangement also meets one condition for carrying out the method of my invention because the tooth No. 1 of the work gear is shaved consecutively by the cutting edges 1, 4', 3', 2', is thereupon engaged by that tooth which is without cutting edges, is then shaved by the cutting edges 4, 3, 2, 1, is thereupon shaved by the cutting edges 4′, 3′, 2′, 1′, is then engaged by the tooth which is free of cutting edges, etc. Thus, after nine revolutions of the work gear, each tooth of this gear gives off eight shavings. The operation is repeated during the next nine revolutions of the work gear, and so on.

The situation is much more complicated if the work gear comprises a large number of teeth, but the shaving operation follows the same pattern.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine for shaving the flanks of teeth on a work gear, in combination, a rotary gear-like tool comprising at least one group of teeth mating with the teeth of the work gear and having helically arranged cutting edges; and means for rotating the tool at crossed axes with the workpiece in such direction that the helically arranged cutting edges of said group of teeth remove from tooth flanks of the workpiece shavings in directions from the finished toward the unfinished portions of such flanks.

2. A combination as set forth in claim 1, wherein one of two numbers which respectively correspond to the number of teeth forming said group and to the number of teeth on the work gear is divisible with a rest by the other thereof.

3. In a machine for shaving the flanks of teeth on a work gear, in combination, a rotary gear-like tool comprising at least one group of teeth mating with the teeth of the work gear and having cutting edges forming at least one helix; and means for rotating the tool at crossed axes with the workpiece, the direction of rotation of said tool being such and the direction of the lead of said helix with reference cutting to the direction of the angle between the projection of the axis of the tool into a plane passing through the axis of the work gear and the axis of the work gear also being such that the cutting edges forming said helix remove from tooth flanks of the workpiece shavings in directions from the finished toward the unfinished portions of such flanks.

4. A combination as set forth in claim 3, wherein said cutting edges are arranged to remove from said tooth flanks shavings from the one toward the other axial end of teeth on the work gear and in the same direction in which the cutting edges move relative to the flanks as a result of crossed-axes mounting of the gears.

5. A combination as set forth in claim 3, further comprising means for axially moving one of the gears with reference to the other gear through distances which at most equal the lead of said helix.

6. A combination as set forth in claim 3, wherein the number of teeth on the work gear equals $$n \cdot Z_g \pm D$$

wherein $n$ is a whole number, wherein $Z_g$ is the number of teeth in said group, and wherein D is a whole number which is less than the number of cutting edges forming said helix.

7. In a machine for shaving the flanks of teeth on a work gear, in combination, a rotary gear-like tool comprising at least one group of teeth mating with the teeth of the work gear and having helically arranged cutting edges; and means for rotating the tool at crossed axes with the workpiece in such direction that the cutting edges remove from tooth flanks of the workpiece shavings in directions from the finished toward the unfinished portions of such flanks and that the thickness of shavings increases in the same directions.

8. In a machine for shaving the flanks of teeth on a work gear having $Z_w$ teeth, in combination, a rotary gear-like tool comprising at least one group of teeth mating with the teeth of the work gear and having $Z_g$ cutting edges forming at least one helix, the number $Z_g$ of such cutting edges being equal to $$\frac{1}{n}(Z_w \pm D)$$

wherein $n$ is a whole number which is divisible by one and wherein D is a whole number which is less than $Z_g$; and means for supporting said tool in crossed-axes relation with reference to the work gear so that, when said tool rotates, its cutting edges remove consecutive shavings in directions from the finished toward the unfinished portions of the flanks.

9. A structure as set forth in claim 8, wherein the lead of said helix is a right-hand lead, wherein the projection of the axis of the tool onto a plane passing through the axis of the work gear makes an acute angle with and is angularly displaced in a clockwise direction with reference to the axis of the work gear, and wherein $$Z_g = \frac{1}{n}(Z_w + D)$$

10. A structure as set forth in claim 8, wherein the lead of said helix is a left-hand lead, wherein the projection of the axis of the tool onto a plane passing through the axis of the work gear makes an acute angle with and is angularly displaced in an anticlockwise direction with reference to the axis of the work gear, and wherein $$Z_g = \frac{1}{n}(Z + D)$$

11. A structure as set forth in claim 8, wherein the lead of said helix is a right-hand lead, wherein the projection of the axis of the tool onto a plane passing through the axis of the work gear makes an acute angle with and is angularly displaced in an anticlockwise direction with reference to the axis of the work gear, and wherein $$Z_g = \frac{1}{n}(Z_w - D)$$

12. A structure as set forth in claim 8, wherein the lead of said helix is a left-hand lead, wherein the projection of the axis of said tool onto a plane passing through the axis of the work gear makes an acute angle with and is angularly displaced in a clockwise direction with reference to the axis of the work gear, and wherein $$Z_g = \frac{1}{n}(Z_w - D)$$

References Cited by the Examiner

UNITED STATES PATENTS

| | | | |
|---|---|---|---|
| 2,328,783 | 9/43 | Christman | 90—1.6 |
| 2,887,014 | 5/59 | Praeg et al. | 90—1.6 |
| 2,887,015 | 5/59 | McNabb | 90—1.6 |

ANDREW R. JUHASZ, *Primary Examiner.*

LEON PEAR, *Examiner.*